No. 891,834. PATENTED JUNE 30, 1908.
T. GILMORE, JR.
CONTROLLER OPERATING MEANS.
APPLICATION FILED NOV. 3, 1906.

Witnesses
Oliver W. Sharman
Victor E. Jullien

Inventor
Thomas Gilmore Jr.
By
Chas. E. Lord
Attorney

UNITED STATES PATENT OFFICE.

THOMAS GILMORE, JR., OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

CONTROLLER-OPERATING MEANS.

No. 891,834.  Specification of Letters Patent.  Patented June 30, 1908.

Application filed November 3, 1906. Serial No. 341,854.

*To all whom it may concern:*

Be it known that I, THOMAS GILMORE, Jr., a citizen of the United States, residing at Norwood, in the county of Hamilton and State of Ohio, have invented certain new and useful Improvements in Controller-Operating Means, of which the following is a full, clear, and exact specification.

My invention relates to improvements in motor controllers and particularly to the operating means for controllers adapted for use in connection with electric railway equipments.

Unless some special means is provided to prevent it, an inexperienced or careless operator may move the ordinary controller rapidly from the "off" to the full "on" position without pausing properly at its predetermined operative positions. This rapid movement is apt to cause considerable damage to the motors and to the controller itself. Certain devices have been proposed for compelling the operator to stop at the predetermined controller positions for short intervals of time, but these as a rule are either complicated or unsightly.

It is the object of my present invention to produce a positive step-by-step movement of the controller so as to prevent a too rapid supply of current to the motor or motors controlled thereby; and to provide means for doing this which shall be both simple in operation and manufacture, and not clumsy or unsightly in appearance.

The invention therefore consists of a controller handle carrying a pawl entirely covered thereby, a notched member with which the pawl coöperates to stop the handle at predetermined points in its forward movement, and means operated by the handle during a slight backward movement thereof for releasing said pawl.

More specifically my invention consists in the combination of a handle comprising two parts pivoted to each other, a fixed notched member, a latch carried by one part of the handle and biased toward the notched member, a bell-crank lever operatively connected to the latch, and a projection from the second part of the handle so placed that upon a backward movement of that part alone, it engages and moves the bell-crank lever to withdraw the latch from the notched member.

The invention further consists in improved details of construction and novel combinations of parts which will be hereinafter described and more particularly pointed out in the appended claims.

Figure 1:
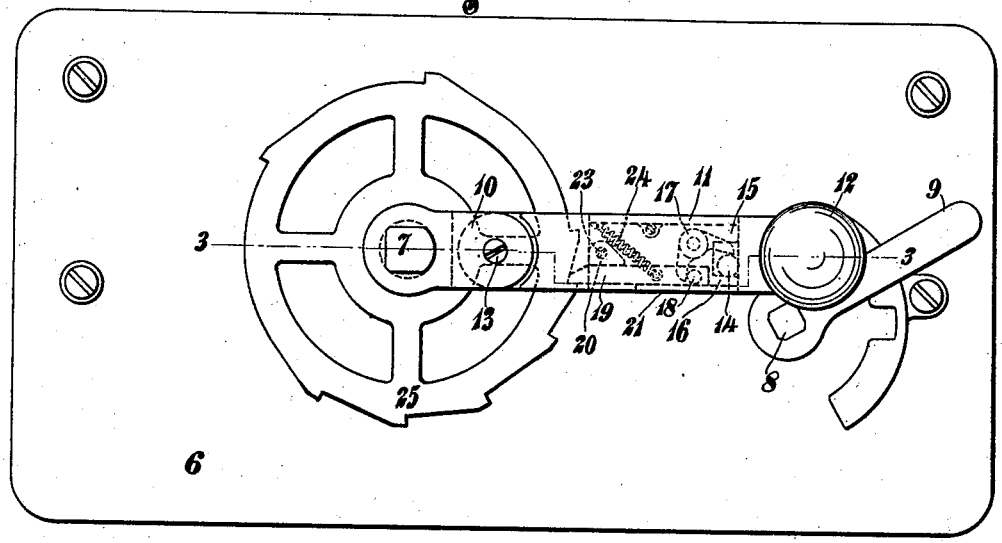
Figure 2:
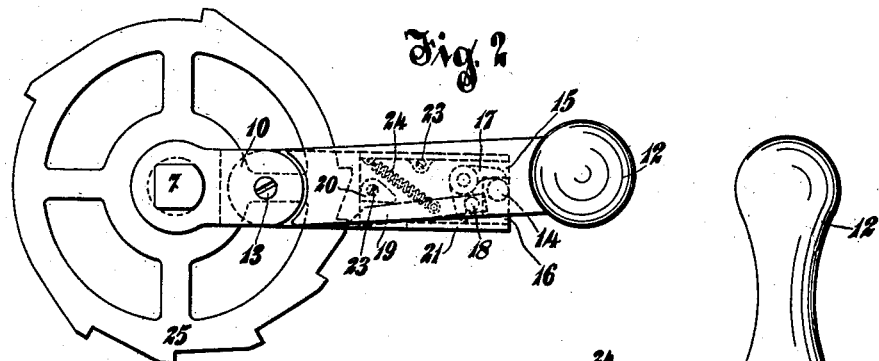
Figure 3:
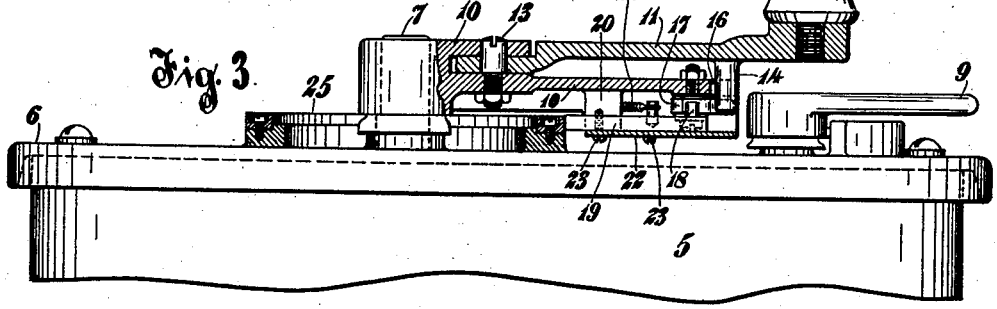

In the accompanying drawings, which illustrate the preferred embodiment of my invention, Figure 1 is a plan view of a controller equipped with my improved operating handle; Fig. 2 is a plan view of the handle showing the same in a different operative position; and Fig. 3 is a front elevation of the handle and part of the controller casing, partly in section on the line 3—3 of Fig. 1.

Referring now to the figures of the drawing, the controller casing 5 is provided with a cap plate 6 through which projects the upper ends of the main drum shaft 7 and the reversing switch shaft 8. The latter shaft is provided with the customary operating handle 9. The shaft 7, however, is provided with my improved handle for producing a positive step-by-step or notching-up movement of the main drum. This handle is so constructed and arranged that it insures a gradual operation of the controller so as to permit the motors to gain speed to such an extent that the proper counter-electromotive force is generated thereby before the next step of the controller can be taken. This arrangement protects the motors and the controller against damage due to current overloads, and also effects an economy in the operation of the system by preventing an unnecessary waste of current in starting the motor or motors.

The operating handle of the main drum comprises a bifurcated arm 10 fixed on the end of the shaft 7, and a second arm 11 movable relatively to the arm 10 and carrying the knob 12 adapted to be grasped by the operator. The arm 11 is pivoted on the stud 13 carried by the bifurcated arm 10 and is limited in its movement relative to said arm 10 by a downward projection or pin 14 carried by the arm 11 and playing between the flanges 15 and 16 formed at the extreme outer end of the arm 10. The pin 14 also engages one arm of the bell-crank lever 17 pivoted on the arm 10, the other arm of said bell-crank lever engaging a pin 18 in a sliding latch or pawl 19 carried by the arm 10. This pawl can slide between a projection 20 and an apron 21, both of which extend downward from the arm 10, and is supported from beneath by a plate 22, attached to the arm 10 as by screws 23. As the apron 21 is cut away, directly opposite the projection 20, the latch can also turn about the outer corner of said projection 20. The latch 19 is biased, as by a spring 24, toward engagement with the notches of a stationary notched plate 25, which may be attached to the cap plate 6 of the controller. The notches of this plate mark the operative positions of the controller.

In the operation of my controlling handle, when the knob 12 is grasped by the operator and the handle is moved in a clockwise direction, the pin 14 engages with the flange 16, and the two arms 10 and 11 of the handle move forward together to rotate the shaft 7. During this forward movement the pawl 19 is drawn into one of the notches of the notched member 25 by the spring 24, and the forward movement of the controller is stopped when the parts reach a position corresponding to that shown in Fig. 1. It is now necessary for the operator, in order to move the controller farther forward, first to move the arm 11 a comparatively slight distance backward, turning it about its pivot 13 until the pin 14 engages the flange 15. During this movement the arm 10 does not move. The pin 14, however, engages the bell-crank lever 17 and through it draws out the latch or pawl 19 by a sliding movement from the notch with which it is in engagement. As soon as the pawl 19 clears the side of the notch in which it was seated, the spring 24 acts to rotate it about the outer corner of the extension 20 to bring it into the position shown in Fig. 2 so that when the pawl is released from the bell-crank lever 17 and the projection 14 by the next forward movement of the arm 11, the pawl 19 will not engage in the same notch from which it has just been lifted. When this next forward movement of the arm 11 takes place the pin 14 again engages the flange 16, and then through this engagement the handle in its entirety moves the shaft 7 forward until the pawl 19 engages in the next notch of the member 25 to again stop this forward movement. This step-by-step movement may be continued until the controller reaches its full "on" position. During the backward or counter-clockwise movement of the controller, the arm 10 and shaft 7 are moved by the engagement of the pin 14 and flange 15, and the pawl 19 is held away from the notched plate 25 against the action of the spring 24 by the engagement of the pins 14 and 18 with the bell-crank lever 17 as shown in Fig. 2. Thus the teeth of the notched member 25. do not interfere with the free movement of the controller handle backward toward the "off" position.

By having the movement of the latch or pawl substantially perpendicular to the direction of movement of the handle, it is possible to have any desired number of notches in the notch plate. In other devices this is not possible. And by having the latch directly beneath the handle the general appearance of the device is much improved.

In the appended claims I aim to cover all modifications and changes which do not involve a departure from the spirit and scope of my invention.

Having thus described my invention what I claim as new and desire to secure by Letters Patent is:—

1. In combination, a controller handle, a single pawl carried thereby and slidable longitudinally thereof, a notched member with which said pawl coöperates, and means for causing said pawl to engage one of the notches of said member when the handle is moved forward and for releasing the pawl by a slight backward movement of the handle.

2. In combination, a controller, a two-part handle therefor, one part being slightly movable relative to the other, a single pawl carried by one part and slidable longitudinally thereof, a fixed notched member coöperating with the pawl, means for causing said pawl to engage one of the notches of said member as the handle is moved forward, and means whereby a slight backward movement of one part of said handle releases said pawl.

3. In combination, a controller handle, a single pawl carried by the handle and entirely covered thereby, a notched member with which the pawl coöperates to stop the handle at predetermined points in its forward movement, and means operated by the handle during a slight backward movement thereof for releasing said pawl.

4. In combination, a controller handle, a single pawl carried thereby and slidable longitudinally thereof, a notched member with which said pawl coöperates, and means for causing said pawl to engage one of the notches of said member when the handle is moved forward, for releasing the pawl by a slight backward movement of the handle, and for preventing the pawl from engaging the same notch when the handle is again moved forward.

5. In a controller, a shaft, an operating handle therefor comprising an arm fixed to the shaft and a second arm pivoted to the first and having a limited movement relative thereto, a notched member, a single pawl carried by the handle, means for moving said pawl into engagement with a notch of said member which is covered by said handle, and means whereby a backward movement of the second arm alone disengages the pawl from said notch.

6. In combination, a controller handle, a single pawl carried thereby, a notched member coöperating with said pawl, and means whereby a forward movement of the handle causes the pawl to engage a notch of said member, and a comparatively slight backward movement of the handle withdraws the pawl from engagement with said member by a sliding movement.

7. In combination, a controller handle, a single pawl carried thereby, a notched member coöperating with said pawl, and means whereby a forward movement of the handle causes the pawl to engage a notch of said member, and a comparatively slight backward movement of the handle withdraws the pawl from engagement with said member by a sliding movement and causes it by a turning movement to be prevented from engaging the same notch when the handle is again moved forward.

8. In a controller, a shaft, an operating handle therefor comprising an arm fixed to the shaft, and a second arm pivoted to the first, a notched member, a single pawl carried by the first arm and biased toward engagement with the notched member to stop the forward movement of the controller at predetermined positions, and means whereby a backward movement of the second arm alone withdraws the pawl from engagement with the notched member by a sliding movement.

9. In a controller, a shaft, an operating handle therefor comprising an arm fixed to the shaft, and a second arm pivoted to the first, a notched member, a single pawl carried by the first arm and biased toward engagement with the notched member to stop the forward movement of the controller at predetermined positions, and means whereby a backward movement of the second arm alone withdraws the pawl from engagement with the notched member by a sliding movement, and by a turning movement of said pawl prevents its engagement in the same notch when the handle is again moved forward.

10. In combination, a two-part handle, one part being pivoted on the other to permit a slight independent movement, a notch plate, and a single latch actuated approximately in a direction perpendicular to the direction of movement of the handle by a reverse movement of one part of the latter to disengage the latch from the notch plate.

11. In combination, a two-part handle, one part being pivoted on the other to permit a slight independent movement thereof, a notch plate, and a single latch actuated approximately in a direction perpendicular to the direction of movement of the handle by a reverse movement of one part of the latter to disengage the latch from the notch plate, and advanced slightly by a turning movement to prevent engagement of the latter in the same notch when the handle is afterward moved forward.

12. In combination, a two-part handle, one part being pivoted on the other and alone arranged to be grasped by the operator, a fixed notched plate, a latch carried by one part of the handle and biased toward the notch plate, and a bell-crank lever pivoted to one part of the handle and in operative engagement with the other part of the handle and the latch.

13. In combination, a handle comprising two parts pivoted to each other, a fixed notched member, a latch carried by one part of the handle and biased toward the notched member, a bell-crank lever operatively connected to the latch, and a projection from the second part of the handle so placed that upon a backward movement of that part alone it engages and moves the bell-crank lever to withdraw the latch from the notched member.

14. In combination, a handle comprising two parts pivoted to each other, a fixed notched member, a latch carried by one part of the handle and biased toward the notched member, a bell-crank lever operatively connected to the latch, and a projection from the second part of the handle so placed that upon a backward movement of that part alone it engages and moves the bell-crank lever to withdraw the latch from the notched member by a sliding movement.

15. In combination, a handle comprising two parts pivoted to each other, a fixed notched member, a latch carried by one part of the handle and biased toward the notched member, a bell-crank lever operatively connected to the latch, and a projection from the second part of the handle so placed that upon a backward movement of that part alone it engages and moves the bell-crank lever to withdraw the latch from the notched member and cause it to be moved so that when the handle is afterward moved forward it will clear the notch it formerly engaged.

16. In combination, a handle comprising two parts pivoted to each other, a fixed notched member, a latch carried by one part of the handle and biased toward the notched member, a bell-crank lever operatively connected to the latch, and a projection from the second part of the handle so placed that upon a backward movement of that part alone it engages and moves the bell-crank lever to withdraw the latch from the notched member by a sliding movement and cause it to be moved by a turning movement so that when the handle is again moved forward it will clear the notch it formerly engaged.

In testimony whereof I affix my signature, in the presence of two witnesses.

THOMAS GILMORE, Jr.

Witnesses:
GEO. B. SCHLEY,
ARTHUR F. KWIS.